July 4, 1933.   E. CHAPMAN   1,916,414

DRILL JIG

Filed July 29, 1930

INVENTOR
Edwin Chapman
BY
Gifford, Scull & Burgess
ATTORNEYS

Patented July 4, 1933

1,916,414

UNITED STATES PATENT OFFICE

EDWIN CHAPMAN, OF CATASAUQUA, PENNSYLVANIA, ASSIGNOR TO FULLER LEHIGH COMPANY, OF FULLERTON, PENNSYLVANIA, A CORPORATION OF DELAWARE

DRILL JIG

Application filed July 29, 1930. Serial No. 471,440.

This invention relates to a drill jig that is provided with holes or guides for drill bits, that is especially useful in drilling nipples so that they can be removed from plates, boiler headers, drums or the like, but the invention is not restricted to this particular use.

It has been found, in removing tubes from tube seats into which they have been expanded, after the tubes have been cut off, there is danger of injuring the tube seat when the remaining portion or nipples are cut out with tools, either by hand or with pneumatic tools. Either the tube seats are injured or much time is lost due to the necessity of exercising care not to injure the tube seats.

Figure 2:
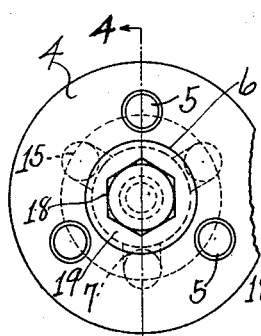
Figure 1:
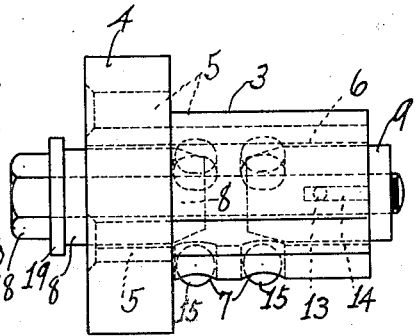
Figure 3:
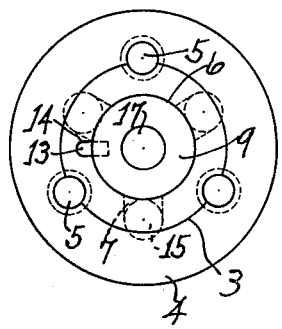
Figure 4:
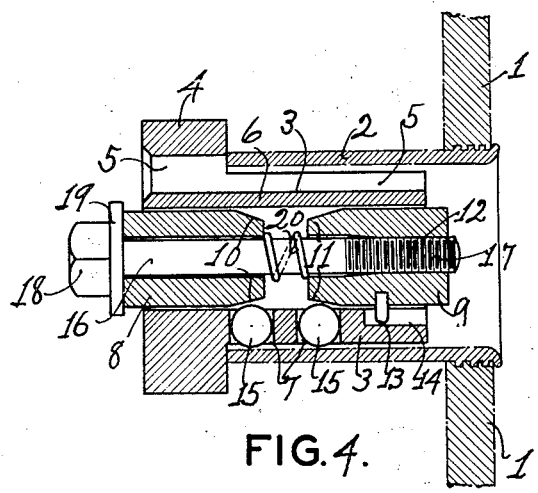

By the present invention nipples that have been cut off at the ends of tubes can be quickly and safely removed from the tube seats without danger of injuring them. The invention will be understood from the description in connection with the accompanying drawing in which Fig. 1 is a side view of the device, Fig. 2 is a view from one end, Fig. 3 is a view from the other end of the device, and Fig. 4 is a section along the line 4—4 of Fig. 2.

In the drawing reference character 1 indicates a portion of a tube sheet, drum shell or the like from which tube nipples are to be removed. One of the tube nipples is indicated at 2, the tube having been cut off preparatory to removing and replacing the same.

Reference character 3 indicates the cylindrical body portion of a jig for guide drills, this cylindrical body portion being small enough to enter the nipple 2. The jig is preferably made of hardened steel and is provided with an enlarged head portion 4 that may rest upon the end of the nipple 2. The jig is provided with a plurality of guide holes 5 for drill bits, these holes extending through the head 4 and along the outside circumferential surface of the body portion 3 of the jig. Three such holes are indicated in the drawings but a larger or smaller number may be provided. The holes 5 are so placed that when drills enter these holes they will cut away the metal along the inside surface of the nipple 2 sufficiently to weaken the same so much that the nipple can be broken out with a hammer, or the like, without danger of injuring the tube seat, and also without necessitating skilled mechanics for doing this work.

The jig is provided at its center with a longitudinal hole or opening in which an anchoring device for the jig is placed. Slots 7 are provided through the wall of the portion 3 of the jig 2, circumferential rows having three slots in each row being shown in the illustrative embodiment of the invention. These slots are offset circumferentially with respect to the holes 5.

Round hollow plugs 8 and 9 of hardened steel are placed in the hole 6. These plugs 8 and 9 have conical or wedge shaped ends as indicated at 10 and 11. The plug 9 is internally threaded as indicated at 12. A pin 13 attached to the plug 9 extends into a longitudinal slot 14 along the inside of the lower portion of the body 3 of the jig. A number of slots 14 may be provided spaced circumferentially along the inside of the body 3 so that the plug 9 can be located in the different circumferential positions in the jig to avoid excessive wear on certain spots, as will be clear from the description below.

Hardened steel balls 15 are located in the slots 7, the diameter of each one of these balls being slightly greater than the distance from the outside surfaces of the plugs 8 and 9 to the inside surface of the nipple 2. A bolt 16 extends through the hollow portion of the plug 8 and has a threaded portion 17 that enters the screw threaded portion of the plug 9. The bolt 16 is provided with a square head 18 for a wrench and also with a rim or washer 19 that contacts with the outer end of the plug 8. A compression spring 20 may be located around the bolt 16 between the plugs 8 and 9.

In operating this device the body 3 of the jig is inserted into a nipple with the heads 8 and 9 separated to permit the balls 15 to move inwardly a short distance. The bolt 16 is then tightened, drawing the heads 8 and 9 toward each other and forcing the balls 15 outwardly as the conical portions 10 and 11 of the heads 8 and 9 contact with these balls, thus pressing them firmly against the inside walls of the nipple 2 and anchoring the device in place. Drills are then caused to enter the holes 5 and cut grooves along the wall of the nipple 2, weakening this nipple sufficiently to enable it to be broken away from the seat in the sheet 1 without injuring the seat.

I claim:

Apparatus for the removal of nipples of circular cross-section expanded into tube seats comprising a drill jig having a cylindrical body portion adapted to be inserted into the free end of the nipple and a head adapted to abut said free end, one or more drill openings in said head, one or more longitudinal grooves in the peripheral surface of said body portion in axial alignment with a corresponding drill opening, each said drill opening being arranged within the outer periphery of the nipple, whereby said drill opening and corresponding groove will guide a drill inserted through said drill opening in a drilling operation forming a longitudinal groove in the inner peripheral wall of the nipple but without removing the metal of said tube seat, and expansible means adjustably operative from the head end of said jig and within said body portion and adapted to frictionally engage the inner peripheral wall of said nipple for centering and holding said jig in position in said nipple.

EDWIN CHAPMAN.